United States Patent
Williams (10) Patent No.: US 10,379,878 B2
(45) Date of Patent: Aug. 13, 2019

(54) GENERATING PURCHASE ORDER DATA BASED ON PHYSICAL IDENTIFIERS

(71) Applicant: Hewlett-Packard Development Company, L.P., Houston, TX (US)

(72) Inventor: Lawrence Williams, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 136 days.

(21) Appl. No.: 15/521,997

(22) PCT Filed: Jan. 23, 2015

(86) PCT No.: PCT/US2015/012756
§ 371 (c)(1),
(2) Date: Apr. 26, 2017

(87) PCT Pub. No.: WO2016/118168
PCT Pub. Date: Jul. 28, 2016

(65) Prior Publication Data
US 2017/0344389 A1    Nov. 30, 2017

(51) Int. Cl.
*G06F 9/44* (2018.01)
*G06F 9/445* (2018.01)
(Continued)

(52) U.S. Cl.
CPC ........ *G06F 9/44505* (2013.01); *G06F 9/4411* (2013.01); *G06K 19/07* (2013.01);
(Continued)

(58) Field of Classification Search
CPC .. G06F 8/65; G06F 8/61; G06F 9/441; G06Q 30/06; G06Q 30/04
See application file for complete search history.

(56) References Cited

U.S. PATENT DOCUMENTS 7,423,527 B2 * 9/2008 Bajwa ................ H04L 12/4633
340/10.1
7,565,650 B2    7/2009 Bhogal
(Continued)

FOREIGN PATENT DOCUMENTS

KR    10-0800593           2/2008
KR    10-2008-0037799 A    5/2008
KR    10-2012-0075512 A    7/2012

OTHER PUBLICATIONS

Donald F. Norris et al., Request for Proposal: Automated Data Processing Equipment and Software for McCook, Nebraska, Aug. 1, 1982, [Retrieved on Apr. 19, 2019]. Retrieved from the internet: <URL: https://digitalcommons.unomaha.edu/cgi/viewcontent.cgi> 37 Pages (1-35) (Year: 1982).*

(Continued)

*Primary Examiner* — Anibal Rivera
(74) *Attorney, Agent, or Firm* — HP Inc. Patent Department (57) ABSTRACT

Some examples provide a method where based on physical identifier data relating to a set of physical identifiers associated with a customer-ordered computer system, purchase order data associated with the customer-ordered computer system is generated. The purchase order data describes a set of software items to be installed on the customer-ordered computer system. The purchase order data is stored on a datastore in association with a hardware identifier associated with the customer-ordered computer system. Subsequently, a software tool is sent to the customer-ordered computer system, where the software tool is configured to cause the customer-ordered computer system to obtain the purchase order data from the datastore based on the hardware identifier, and download the set of software items based on the purchase order data obtained from the datastore.

14 Claims, 6 Drawing Sheets

(51) Int. Cl.
*G06Q 30/00* (2012.01)
*G06Q 30/06* (2012.01)
*G06Q 30/04* (2012.01)
*G06F 9/4401* (2018.01)
*G06K 19/07* (2006.01)
*G06Q 10/10* (2012.01)
*G06Q 10/06* (2012.01)

(52) U.S. Cl.
CPC .............. *G06Q 10/10* (2013.01); *G06Q 30/04* (2013.01); *G06Q 30/06* (2013.01); *G06Q 10/06* (2013.01); *G06Q 10/0631* (2013.01)

(56) References Cited

U.S. PATENT DOCUMENTS

| | | | |
|---|---|---|---|
| 7,654,464 B2* | 2/2010 | Babine | G06Q 10/06 235/375 |
| 7,716,077 B1* | 5/2010 | Mikurak | G06Q 10/06 705/7.12 |
| 8,121,874 B1* | 2/2012 | Guheen | G06Q 10/063 705/7.11 |
| 8,769,479 B2* | 7/2014 | Clark | G06Q 30/06 717/101 |
| 2002/0013721 A1* | 1/2002 | Dabbiere | G06Q 10/06 705/26.2 |
| 2005/0091417 A1* | 4/2005 | Bhogal | G06F 8/61 710/1 |
| 2006/0220865 A1* | 10/2006 | Babine | G06Q 10/06 340/572.1 |
| 2008/0017722 A1* | 1/2008 | Snyder | G06Q 10/00 235/494 |
| 2011/0087559 A1* | 4/2011 | Paul | G06Q 30/0635 705/26.81 |
| 2011/0258058 A1* | 10/2011 | Carroll | G06Q 30/06 705/15 |
| 2011/0265078 A1* | 10/2011 | Beatty | G06F 8/61 717/173 |
| 2012/0166241 A1* | 6/2012 | Livingston | G06Q 10/0631 705/7.12 |
| 2012/0254859 A1* | 10/2012 | DiCarlo | G06F 8/65 717/178 |
| 2012/0290418 A1* | 11/2012 | Itwaru | G06Q 30/04 705/16 |
| 2013/0109323 A1* | 5/2013 | Ruutu | H04B 5/0031 455/68 |
| 2013/0159135 A1* | 6/2013 | Jones | G06Q 10/087 705/26.8 |
| 2013/0233922 A1* | 9/2013 | Schoening | G06Q 10/087 235/385 |
| 2013/0254001 A1* | 9/2013 | Acar | G06Q 30/06 705/14.23 |
| 2013/0346252 A1* | 12/2013 | Vellozo Luz | G06Q 30/00 705/26.81 |
| 2016/0244311 A1* | 8/2016 | Burks | B67D 1/0888 |

OTHER PUBLICATIONS

Ching-Wei Chen et al., Content Identification in Consumer Applications, 2000, [Retrieved on Apr. 19, 2019]. Retrieved from the internet: <URL: https://ieeexplore.ieee.org/stamp/stamp.jsp?tp=&arnumber=5202797> 4 Pages (1536-1539) (Year: 2000).*

"Meet Compatible Singles," Executive Insight, May 8, 2011, vol. 2, No. 3, pp. 1-4.

Bill Rice, "RFID in the Supply Chain," Aug. 8, 2006, pp. 1-6, MC Press, Available at: <mcpressonline.com/.

EcVision Inc., ecVision—XpressChain®, 2014, pp. 1-2, San Blue Enterprises Pvt. Ltd., softwaresolutions.fibre2fashion.com.

Gaukler et al., "Applications of RFID in Supply Chains," Jun. 12, 2006, pp. 1-22, ~ise.tamu.edu/people/faculty.

Javed Sikander, "RFID Enabled Retail Supply Chain," Apr. 2005, pp. 1-19, Microsoft Corporation, Available at: <msdn.microsoft.com/en-us/library/ms954628.aspx>.

Picor Software (formerly Solarsoft: formerly CMS Manufacturing Systems, Inc.), "Enterprise Resource Planning (ERP)," 2014, pp. 1-9, SoftSearch, Inc.

TRAX-IT Food Processing and Ingredient Traceability, 2014 pp. 1-8, Merit-Trax Technologies Inc.,~ingredienttraceability.com/.

* cited by examiner

GENERATING PURCHASE ORDER DATA BASED ON PHYSICAL IDENTIFIERS

BACKGROUND

Today made-to-order computer systems, such as desktops, laptops, and the like, are readily available to both business and non-business customers. Generally, customers can visit a retail store, or can visit a retail or manufacturer's website, to submit an order for their desired computer system. After selecting a particular system, a customer may be able to customize their order, oftentimes by selecting hardware or software options they wish to include in their particular system. For instance, when customizing an order for a desktop computer system, a customer may select an operating system, software applications, the type of primary memory, and the type of display output card they wish to include in their desktop computer system. Once completed, the order may be submitted to a computer assembly facility, which may assemble the made-to-order desktop computer system according to the hardware and software options selected by the customer.

BRIEF DESCRIPTION OF THE DRAWINGS

Certain examples are described in the following detailed description in reference to the following drawings.

DETAILED DESCRIPTION OF SPECIFIC EXAMPLES

This disclosure describes example techniques for generating purchase order data based on a physical identifier. Additionally, the disclosure describes examples techniques for utilizing such purchase order data when manufacturing, assembling, or otherwise readying a computer system according to a customer purchase order for the same. As used herein, a customer-ordered computer system can include a computer system being manufactured, assembled, or otherwise readied according to a customer order. During manufacturing or assembly, a customer-ordered computer system may have a hardware component added or a software item installed on the customer-ordered computer system. Various examples described herein can assist in installing software items on a customer-ordered computer system according to a customer purchase order associated with the customer-ordered computer system. In particular, some examples provided herein permit the software items to be installed on the customer-ordered computer system with less human participation than previously required. Some examples provided herein enable the customer-ordered computer system to automatically install software items appropriate for configuration of the customer-ordered computer system (e.g., software items to support installed hardware components). Additionally, some examples provided herein allow installation of software items to begin as the customer-ordered computer system moves between different stages of being readied for the customer (e.g., manufactured or assembled).

Examples of customer-ordered computer systems include, without limitation, desktop computer systems, laptops, servers (e.g., rack mount servers), hand-held devices (e.g., personal digital assistants, smartphones, tablets, etc.), video game consoles, wearable computing devices, and the like. As used herein, a software item can include a software product, such as an operating system (e.g., Microsoft® Windows®, Linux, etc.), a word processing application (e.g., Microsoft® Word, StarOffice®, etc.), a video game (e.g., Call of Duty®), or the like. A software item can also include a software configuration, which may be installed (e.g., implemented) on a hardware component of the customer-ordered computer system (e.g., motherboard BIOS) or on an operating system installed on the customer-ordered computer system. In some instances, installing a software configuration on the customer-ordered computer system can comprise installing a software driver on the operating system of the customer-ordered computer system or adjusting operating system parameters (e.g., to support a hardware component of the customer-ordered computer system). In further instances, installing a software configuration on the customer-ordered computer system can comprise updating firmware of a hardware component of the customer-ordered computer system.

Figure 1:
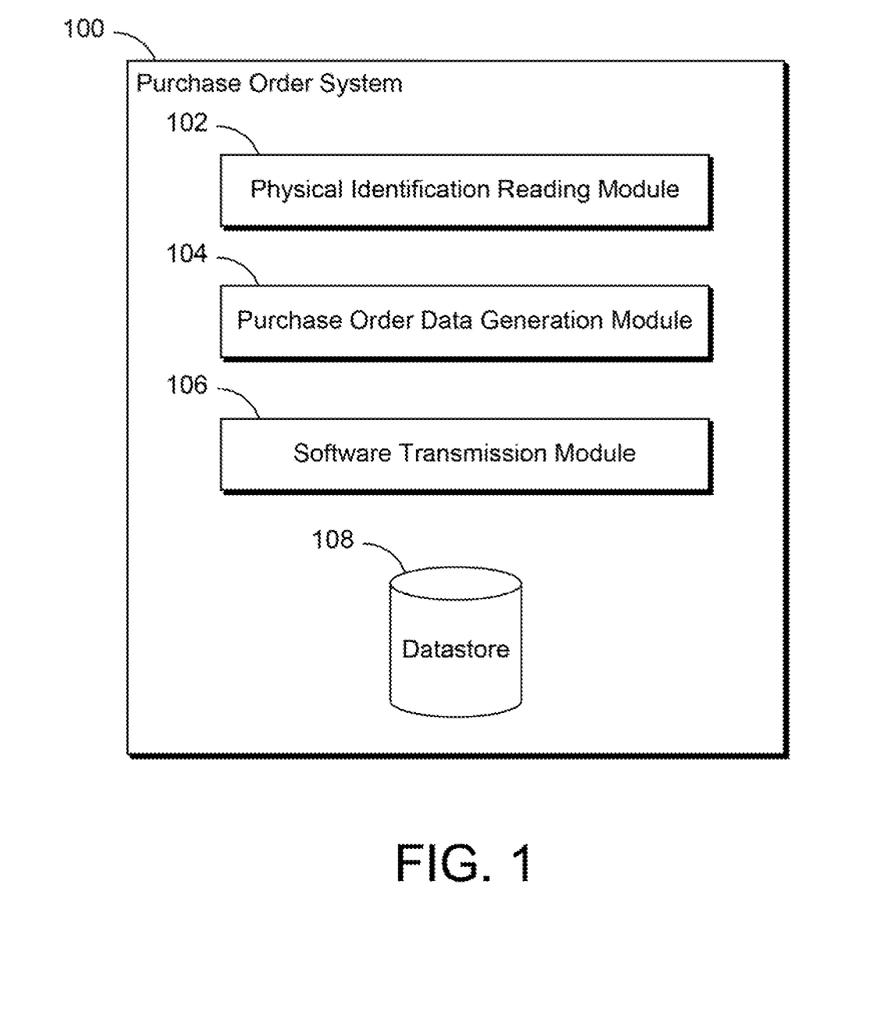
FIG. 1 illustrates an example purchase order system.

FIG. 1 illustrates an example purchase order system 100. As shown, the purchase order system 100 includes a physical identification reading module 102, a purchase order data generation module 104, a software transmission module 106, and a datastore 108. Depending on the example, the purchase order system 100 may comprise a desktop, laptop, a hand-held computing device, a workstation, a server and the like. For instance, the purchase order system 100 may comprise one or more servers, which may be operating on, or implemented using, one or more cloud-based resources, such as a System-as-a-Service (SaaS), Platform-as-a-Service (PaaS), or Infrastructure-as-a-Service (IaaS). In various examples, the components or the arrangement of components in the purchase order system 100 may differ from what is depicted in FIG. 1. For example, the purchase order system 100 can include more or less components than those depicted in FIG. 1.

As used herein, modules and other components of various examples described herein may comprise, in whole or in part, machine-readable instructions or electronic circuitry. For instance, a module may comprise computer-readable instructions executable by a processor to perform one or more functions in accordance with various examples described herein. Likewise, in another instance, a module may comprise electronic circuitry to perform one or more functions in accordance with various examples described herein. The elements of a module may be combined in a single package, maintained in several packages, or maintained separately.

The physical identification reading module 102 may facilitate receiving physical identifier data relating to a set of physical identifiers associated with a customer-ordered computer system. The physical identification reading module 102 may receive the physical identifier data from a reader or a scanner adapted used to read the set of physical identifiers. Examples of physical identifiers utilized can include, without limitation, a barcode (e.g., UPC or QR code), a wireless identifier (e.g., radio-frequency identification [RFID]), and the like. The type of readers or scanner utilized by the physical identification reading module 102 may vary based on the type of physical identifier being read. For instance, a barcode scanner may be utilized for a set of physical identifiers including a UPC or QR code. The set of physical identifiers, associated with the customer-ordered computer system, may be read from a label, printed sheet, or some other physical artifact, which may be affixed to the customer-ordered computer system. The set of physical identifiers may be affixed on the interior of the customer-ordered computer system (e.g., inside the chassis) or on the exterior of the customer-ordered computer system (e.g., on the exterior housing). In some instances, the set of physical identifiers includes a label printed and encoded by a RFID printer, which once printed can be affixed to the exterior of the customer-ordered computer system. Once affixed to the customer-ordered computer system, some or all of the set of physical identifiers may be removed from the customer-ordered computer system (e.g., before shipment to the customer).

Depending on the example, the set of physical identifiers may include a physical identifier associated with a hardware component that is currently included (e.g., installed) in the customer-ordered computer system, or that will eventually be included in the customer-ordered computer system (e.g., as part of readying the customer-ordered computer system according to a customer order). Additionally, the set of physical identifiers may include a physical identifier associated with a software item, such a software product or software configuration, that is currently installed on the customer-ordered computer system, or that will be installed on the customer-ordered computer system (e.g., as part of readying the customer-ordered computer system according to a customer order).

The purchase order data generation module 104 may facilitate generation of a purchase order data based on the physical identifier data received by the physical identification reading module 102. As described herein, the set of physical identifiers can include a physical identifier associated with a software item, such a word processing application or an operating system, that is currently installed on a customer-ordered computer system, or that will be installed on the customer-ordered computer system. Accordingly, the purchase order data generated may describe or otherwise indicate a set of software items that should be installed on the customer-ordered computer system in accordance with a customer order.

The software transmission module 106 may facilitate sending a software tool to the customer-ordered computer system. Depending on the example, the software tool may be initiated at the customer-ordered computer system once it is received by the customer-ordered computer system, and may be initiated before the software tool is received by the customer-ordered computer system in its entirety (e.g., thereby shortening the time required for the customer-ordered computer system). For some examples, the software tool's initialization comprises a soft reboot of the customer-ordered computer system, which results in the software tool being loaded by the customer-ordered computer system during a boot-up process.

After the software tool is initiated at the customer-ordered computer system, the software tool can cause the customer-ordered computer system to automatically determine a hardware identifier associated with the customer-ordered computer system. Examples of hardware identifiers associated with the customer-ordered computer system include, without limitation, a serial number, a model number, or some other identifier associated with the customer-ordered computer system, or a serial number, a model number, or some other identifier associated with a hardware component included by the customer-ordered computer system. The hardware identifier may be unique or non-uniquely associated with the customer-ordered computer system or one its components.

After initialization, the software tool may cause the customer-ordered computer system to determine whether purchase order data associated with the customer ordered computer system exists, and may cause the customer-ordered computer system to determine whether the purchase order data exists on the purchase order system 100 (e.g., on the datastore 108). Where the customer-ordered computer system determines that purchase order data does not exist, the software tool may cause the customer-ordered computer system to prompt a user (e.g., technician) for user input, which can include a user selection of a software item that the user desires installed on the customer-ordered computer system.

Where the customer-ordered computer system determines that purchase order data does exist, the software tool can cause customer-ordered computer system to obtain purchase order data, associated with the customer-ordered system, based on a hardware identifier associated with the customer-ordered computer system. As described herein, the software tool may cause the customer-ordered computer system to obtain the purchase order data from the purchase order system 100, which may have generated the purchase order data and then stored the purchase order data on the datastore 108 in association with the customer-ordered computer system (e.g., in association with its hardware identifier). The customer-ordered computer system may provide the hardware identifier to the purchase order system 100 as part of its request to the purchase order system 100 for the purchase order data.

Eventually, the software tool may cause the customer-ordered computer system to obtain (e.g., download) a set of software items based on purchase order data obtained by the customer-ordered computer system. As noted herein, the purchase order data may describe a set of software items to be installed on the customer-ordered computer system. Where the software item is a software product to be installed, the software tool may cause the customer-ordered computer system to download installation data for the software product from a remote data source, which may be included by the purchase order system 100. The installation data, which is capable of installing the software product on the customer-ordered computer system, may comprise a data image (e.g., of a data disc), a single file (e.g., a setup file or a compressed file), or a plurality of installation-related files.

In communicating (e.g., sending or receiving) data between the purchase order system 100 and various other systems, such a customer-ordered computer system, a variety of network protocols can be utilized, including Hyper-Text Transport Protocol (HTTP), File Transfer Protocol (FTP), and the like. For instance, the purchase order system 100 may utilize FTP to transmit the software tool to a customer-ordered computer system. In another instance, a customer-ordered computer system may receive purchase order data from the purchase order system 100 by way of HTTP. The data may be communicated over a communications network, which may comprise one or more local or wide-area communications networks, such as the Internet, WiFi networks, cellular networks, private networks, public networks, and the like.

As described herein, to facilitate data transfers between the purchase order system 100 and a customer-ordered computer system, the endpoint network with the customer-ordered computer system may be wireless, thereby permitting the customer-ordered computer system. In this way, those customer-ordered computer systems that are battery powered (e.g., laptops, tablets, and other mobile devices) can freely communicate with the purchase order system 100 early during their preparation (e.g., assembly). In particular, such customer-ordered computer system can proceed with operations described herein, such as obtaining purchase order data or downloading software items, once they are operational and as they are being physically moved around in a facility (e.g., a warehouse or an assembly facility). In some examples, the customer-ordered computer system may utilize an externally-coupled wireless network adapter, such as a Universal Serial Bus (USB) wireless network adapter, to establish a wireless network connection and communicate with the purchase order system 100. By using an externally-coupled wireless network adapter, a wireless network connection can be enabled for certain customer-ordered computer systems lacking such capabilities, and compatibility issues between the software tool obtained by the customer-ordered computer system and the wireless network adapter can be avoided. The externally-coupled wireless network adapter may be temporarily coupled to the customer-ordered computer system during its preparation (e.g., assembly) and eventually removed once preparation is complete.

The datastore 108 may be utilized by the purchase order system 100 to store purchase order data generated at the purchase order system 100, and to store such purchase order data in association with a customer-ordered computer system for which the purchase order data is generated. Once the purchase order data is stored on the datastore 108 and in association with the customer-ordered computer system, the purchase order data may be retrieved from the datastore 108 using that association. For instance, where purchase order data generated for a particular customer-ordered computer system is stored on the datastore 108 in association with a hardware identifier of the particular customer-ordered computer system, the hardware identifier can be utilized in retrieving the purchase order data from the datastore 108.

The datastore 108 may also facilitate storage, and subsequent retrieval of, various data utilized by the purchase order system 100 during operations described herein. For instance, the datastore 108 may store a software tool that the purchase order system 100 sends to a customer-ordered computer system. In another instance, the datastore 108 may store a software item, such as a software product or a software configuration, that the purchase order system 100 sends to a customer-ordered computer system.

Depending on the example, the datastore 108 may include a set of data files stored in a data file system, or a database system (e.g., MySQL® or flat-file database). For instance, the purchase order data may be stored as a data file and the purchase order data may be associated with a particular customer-order computer system by way of the filename of the data file (e.g., the filename includes hardware identifier associated with the particular customer-ordered computer system). In another instance, the purchase order data may be stored as a set of database on a database system, and the set of database records may be associated with the hardware identifier of the particular customer-ordered computer system (e.g., hardware identifier included in a database record key).

Figure 2:
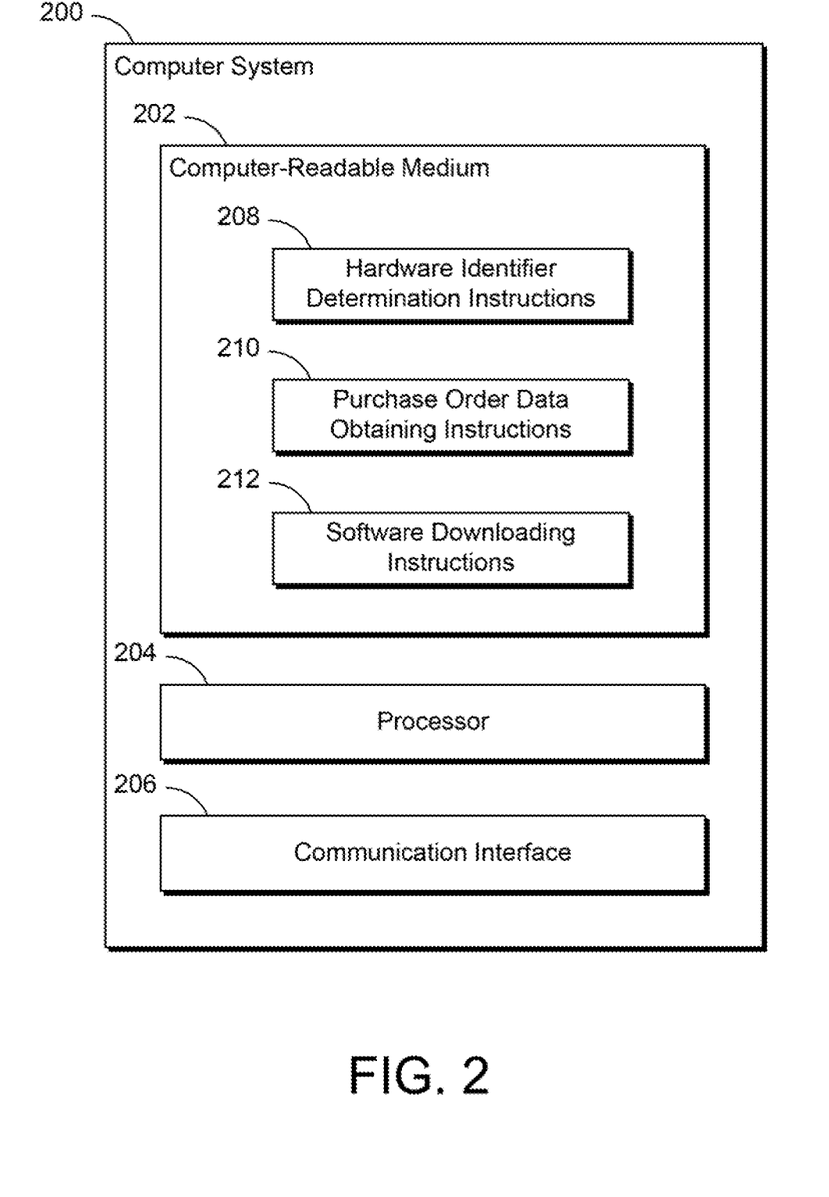
FIG. 2 illustrates an example customer-ordered computer system.

FIG. 2 illustrates an example computer system 200. As shown, the example computer system 200 includes a computer-readable medium 202, a processor 204, and a communications interface 206. In various examples, the components or the arrangement of components of the computer system 200 may differ from what is depicted in FIG. 2. For instance, the computer system 200 can include more or less components than those depicted in FIG. 2.

According to some examples, the computer system 200 is a customer-ordered computer system being readied according to an order for the system submitted by a customer. Additionally, in accordance with certain examples, the computer system 200 as shown is a customer-ordered computer system that has received a software tool configured to cause the computer system 200 to: obtain purchase order data from a datastore using a hardware identifier associated with the computer system 200; and download a set of software items to the computer system 200 based on the purchased order data obtained from the datastore. Depending on the instance, the datastore may be one that is remote to the computer system 200. Additionally, the purchase order data stored on the datastore may be maintained by a system similar to the purchase order system 100 described with respect to FIG. 1.

The computer-readable medium 202 may be any electronic, magnetic, optical, or other physical storage device that stores executable instructions. For example, the computer-readable medium 202 may be a Random Access Memory (RAM), an Electrically-Erasable Programmable Read-Only Memory (EEPROM), a storage drive, an optical disc, or the like. The computer-readable medium 202 can be encoded to store executable instructions that cause the processor 204 to perform operations in accordance with various examples described herein. In various examples, the computer-readable medium 202 is non-transitory. As shown in FIG. 2, the computer-readable medium 202 includes hardware identifier determination instructions 208, purchase order data obtaining instructions 210, and software downloading instructions 212. As described herein, instructions 202, 208, and 212 may represent a software tool downloaded to the computer system 200 and stored on the computer-readable medium 202. As also described herein, the software tool may be downloaded by the computer system 200 from a system similar to the purchase order system 100 described with respect to FIG. 1.

The processor 204 may be one or more central processing units (CPUs), microprocessors, or other hardware devices suitable for retrieval and execution of one or more instructions stored in the computer-readable medium 202. The processor 204 may fetch, decode, and execute the instructions 208, 210, and 212 to enable the computer system 200 to perform operations in accordance with various examples described herein. For some examples, the processor 204 may include one or more electronic circuits comprising a number of electronic components for performing the functionality of one or more of the instructions 208, 210, and 212.

The communications interface 206 may facilitate communication between the computer system 200 and another system, such as the purchase order system 100 described with respect to FIG. 1. In communicating data between the computer system 200 and the other system, the communications interface 206 may do so over a communications network, which may comprise one or more local or wide-area communications networks, such as the Internet, WiFi networks, cellular networks, private networks, public networks, and the like.

The hardware identifier determination instructions 208 may cause the processor 204 to determine a hardware identifier associated with the computer system 200. As described herein, examples of hardware identifiers associated with the computer system 200 can include a serial number, a model number, or some other identifier associated with the computer system 200, or a serial number, a model number, or some other identifier associated with a hardware component included by the computer system 200 (e.g., serial number of a motherboard, or media access control [MAC] address of a network adapter). The hardware identifier may be unique or non-uniquely associated with the computer system 200 or one its components.

The purchase order data obtaining instructions 210 may cause the processor 204 to obtain purchase order data associated with the computer system 200 based on the hardware identifier determined by the hardware identifier determination instructions 208. Depending on the example, the purchase order data obtaining instructions 210 may cause the processor 204 to obtain the purchase order data from a system similar to the purchase order system 100 of FIG. 1 described above.

The software downloading instructions 212 may cause the processor 204 to download a set of software items based on the purchase order data obtained by the purchase order data obtaining instructions 210. As noted herein, the purchase order data may describe a set of software items, such as software products and software configurations, to be installed on the computer system 200. Depending on the example, downloading the set of software items may comprise downloading installation data that permits installation of the set of software items on the computer system 200. Additionally, the installation data downloaded for installing a given software item (e.g., software product or software configuration) on the computer system 200 may differ from installation data downloaded by another computer system for installing that given software item on the other computer system.

The computer system 200 may commence the installation of a given software item after download of installation data for the given software item is complete or partially complete. Additionally, installation of at least some software items in the set of software items may commence before installation data for all software items in the set has been received by the computer system 200.

Figure 3:
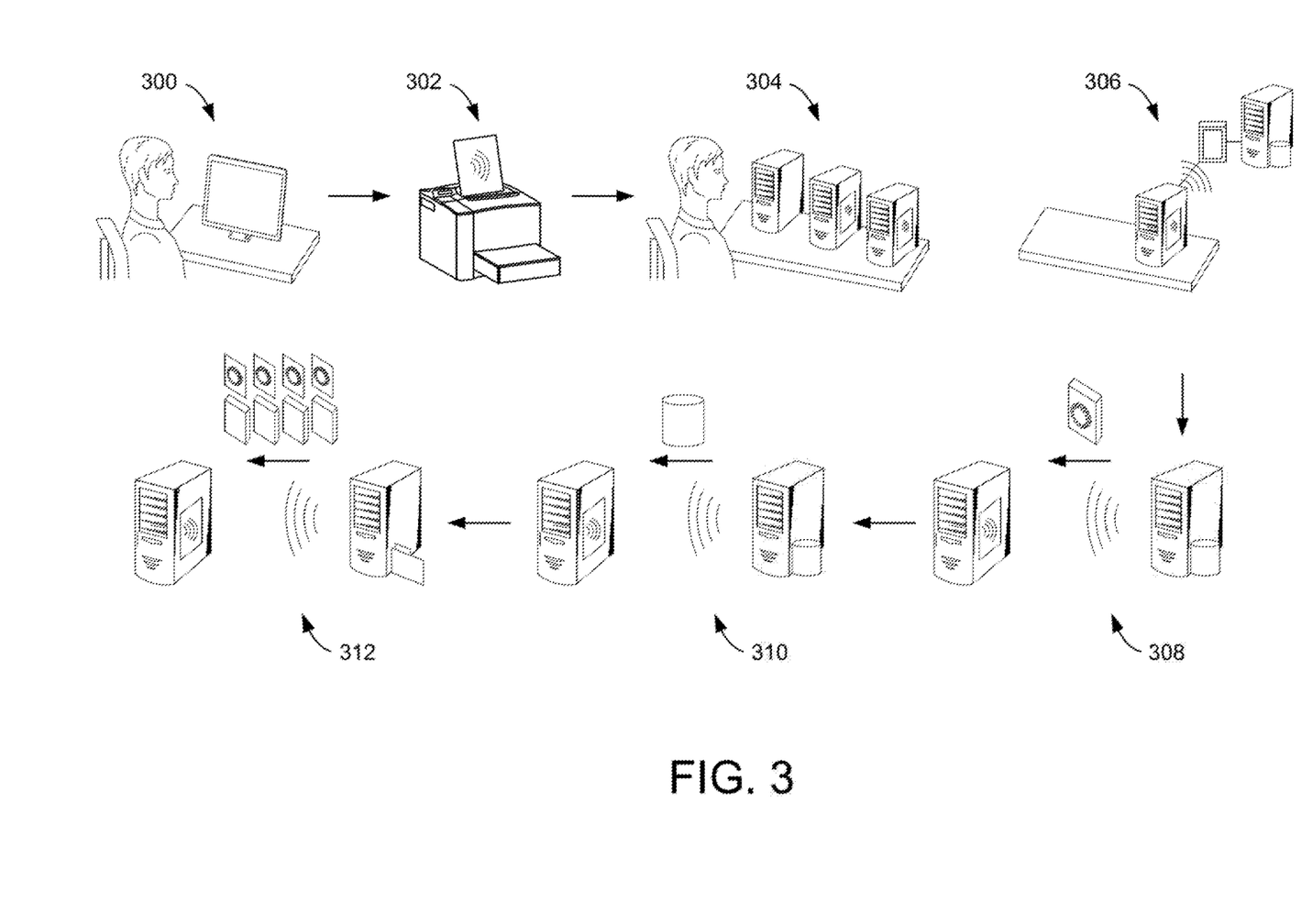
FIG. 3 illustrates an example method for preparing a computer system according to a purchase order.

FIG. 3 illustrates an example method for preparing a computer system according to a purchase order. Although the execution of the method of FIG. 3 is described below with reference with the purchase order system 100 of FIG. 1 and the computer system 200 of FIG. 2, other suitable systems or devices for execution of the method of FIG. 3 can be possible. Aspects of the method of FIG. 3 may be implemented in the form of executable instructions computer-readable medium or in the form of electronic circuitry that cause the operations described to be performed.

The method of FIG. 3 begins at operation 300 an order is received from a customer for a computer system (hereafter, customer-ordered computer system), which may be similar the computer system 200 of FIG. 2. The customer order may customize the customer-ordered computer system according to hardware and software options the customer wishes to include in the customer-ordered computer system.

At operation 302, a set of physical identifiers are generated based on the customer order received at operation 300. As described herein, examples of physical identifiers can include, without limitation, a barcode (e.g., UPC or QR code), a radio-frequency identification (RFID), and the like. The set of physical identifiers can be generated as a label, printed sheet, or some other physical artifact, which may affixed to the customer-ordered computer system.

At operation 304, at least one physical identifier (e.g., RFID) in the set of physical identifiers may be affixed to the customer-ordered computer system as it is prepared according to the customer order received at operation 300. The set of physical identifiers may remain affixed to the customer-ordered computer system as it physically moves through different stages of preparation (e.g., at an assembly facility), and may be removed from the customer-ordered computer system before shipment. The set of physical identifiers may be affixed on the interior of the customer-ordered computer system (e.g., inside the chassis) or on the exterior of the customer-ordered computer system (e.g., on the exterior housing) such that the set of physical identifiers can be read by an appropriate reader or scanner (e.g., RFID reader). In some examples, the set of physical identifiers includes a label printed and encoded by a RFID printer, which once printed can be affixed to the exterior of the customer-ordered computer system.

At operation 306, at least one physical identifier (e.g., RFID) in the set of physical identifiers is read by an appropriate reader or scanner (e.g., RFID reader). Physical identifier data relating to the physical identifier or physical identifiers read by the reader or scanner is provided to a purchase order system similar to the purchase order system 100 of FIG. 1. Based on the physical identifier data received, the purchase order system may generate and store purchase order data for the customer-ordered computer system. As noted herein, the purchase order data may describe a set of software items, such as software products and software configurations, to be installed on the customer-ordered computer system.

At operation 308, the purchase order system sends a software tool to the customer-ordered computer system, where the software tool enables the customer-ordered computer system to obtain purchase order data from the purchase order system and obtain a set of software items based on the purchase order data.

At operation 310, the software tool, received by the customer-ordered computer system at operation 308, causes the customer-ordered computer system to obtain its related purchase order data from the purchase order system. The customer-ordered computer system may obtain its purchase order data from the purchase order system using a hardware identifier associated with the customer ordered computer system, such as a serial number or model number. As described herein, the customer-ordered computer system may receive the purchase order data over a wireless network connection between the customer-ordered computer system and a wireless access point. As also described herein, the wireless network connection may be established using a wireless network adapter (e.g., USB wireless network adapter) externally-coupled to the customer-ordered computer system at some point before operation 308.

At operation 312, the software tool causes the customer-ordered computer system to obtain a set of software items to install on the customer-ordered computer system. As described herein, the customer-ordered computer system may receive installation data for the set of software items from a remote data source, which may be included by the purchase order system.

Figure 4:
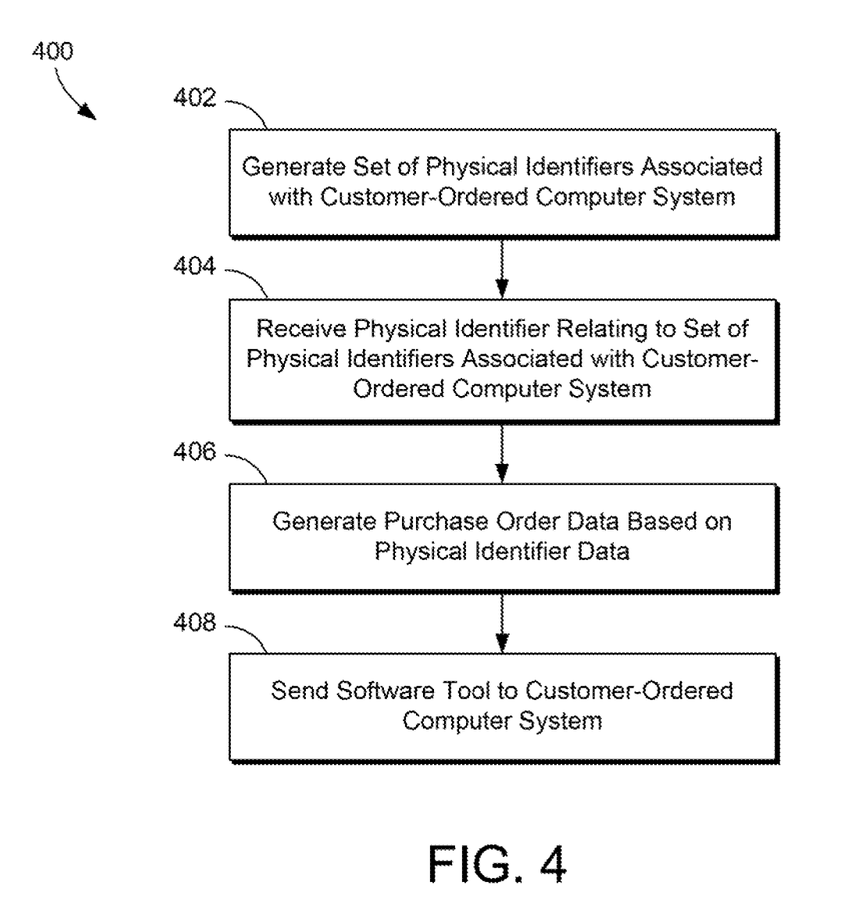
FIGS. 4 and 5 illustrate example methods for generating purchase order data.

FIG. 4 illustrates an example method 400 for generating purchase order data. Although execution of method 400 is described below with reference to the purchase order system 100 of FIG. 1, other suitable systems or devices for execution of method 400 can be possible. Method 400 may be implemented in the form of executable instructions stored on a computer-readable medium or in the form of electronic circuitry.

In FIG. 4, method 400 begins at block 402, with the purchase order system 100 generates a set of physical identifier associated with a customer-ordered computer system. As described herein, examples of physical identifiers can include barcodes, such as UPS and QR codes, and wireless identifiers, such as RFID. During generation, a label, printed sheet or some other artifact that includes the set of physical identifiers can be physically produced.

Eventually, at block 404, the purchase order system 100 receives physical identifier data relating to the set of physical identifiers associated with the customer-ordered computer system. For some examples, the purchase order system 100 receives the physical identifiers data from a reader or scanner configured to read a physical identifier included by the set of physical identifiers and provide the physical identifier data to the purchase order system 100. In certain examples, the set of physical identifiers may include a variety of types of physical identifiers and, as such, reading the set of physical identifiers can involve using a single or different types of readers or scanners to read the set of physical identifiers. The set of physical identifiers included by a customer-ordered computer system may be automatically read from the customer-ordered computer system as the customer-ordered computer system moves through a facility (e.g., warehouse or assembly facility), or may be read from the customer-ordered computer system by a manual act by an individual (e.g., facility technician).

At block 406, the purchase order system 100 generates purchase order data based on the set of physical identifiers received at block 404. As noted herein, the purchase order data can describe a set of software items to be installed with respect to a customer-ordered computer system to which the set of physical identifiers are associated.

At block 408, the purchase order system 100 sends a software tool to the customer-ordered computer system. Once operating on the customer-ordered computer system, the software tool may cause the customer-ordered computer system to obtain (e.g., from the purchase order system 100) the purchase order data generated at block 406. Eventually, the software tool may further cause the customer-ordered computer system to obtain the set of software items described by the purchase order data, which may involve obtaining installation data for the set of software items. Once installation data for the set of software items has been obtained, the installation data may be utilized by the customer-ordered computer to install the set of software items on the customer-ordered computer system.

Figure 5:
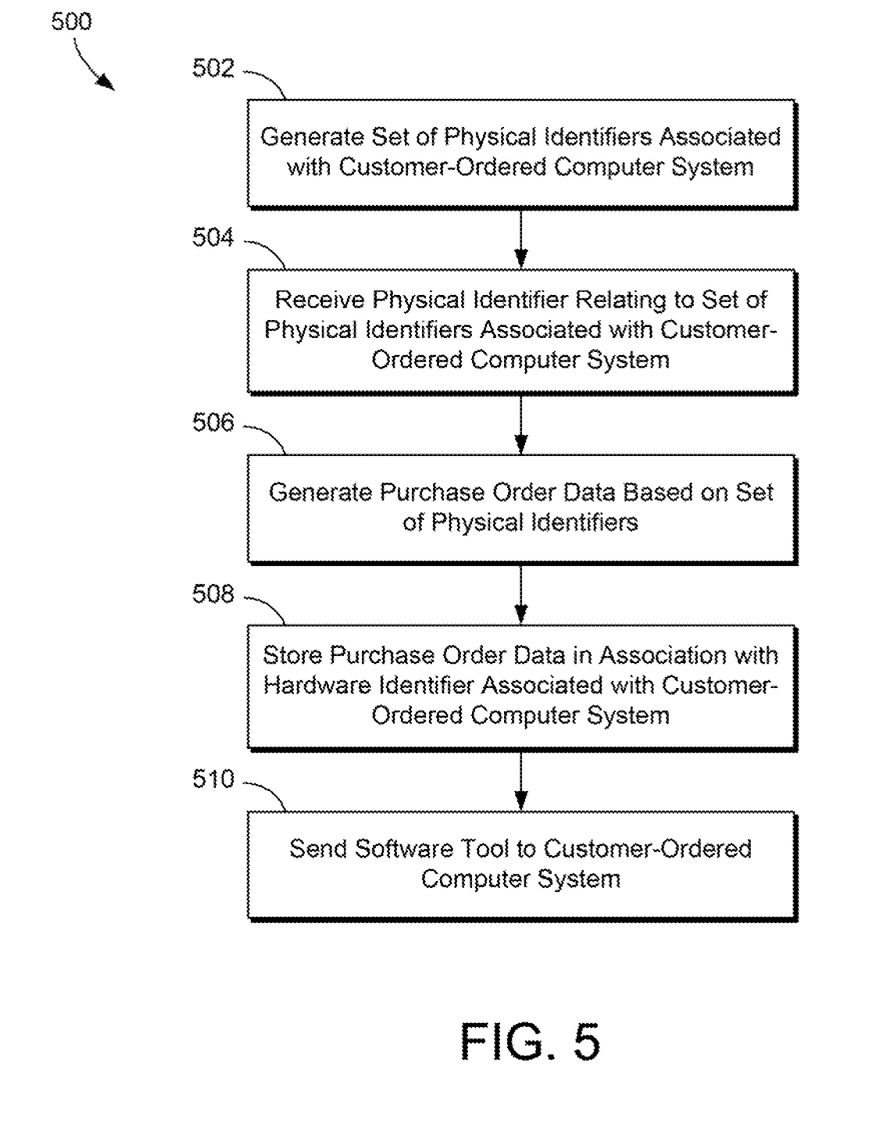

FIG. 5 illustrates an example method 500 for generating purchase order data. Although execution of method 500 is described below with reference to the purchase order system 100 of FIG. 1, other suitable systems or devices for execution of method 500 can be possible. Method 500 may be implemented in the form of executable instructions stored on a computer-readable medium or in the form of electronic circuitry.

In FIG. 5, method 500 begins at block 502, which may be similar to block 402 of method 400, which is described above with respect to FIG. 4. Likewise blocks 504 and 506 may be similar to blocks 404 and 406 of method 400, which are also described above with respect to FIG. 4.

At block 508, the purchase order system 100 stores the purchase order data, generated at block 506, with a hardware identifier associated with the customer-ordered computer system. The purchase order system 100 may, for example, store the purchase order data on the datastore 108. Once stored, a customer-ordered computer system can retrieve purchase order data that is associated with the customer-ordered computer system and may be obtain such data based on (e.g., using) a hardware identifier associated with the customer-ordered computer system.

Method 500 continues to block 510, which may be similar to block 408 of method 400, which is described above with respect to FIG. 4.

Figure 6:
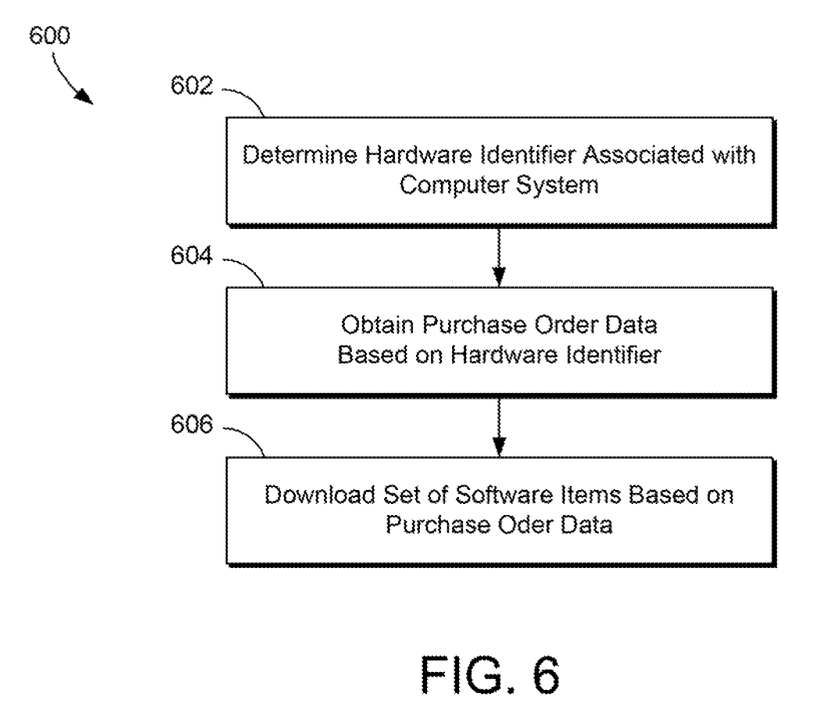
FIG. 6 illustrates an example method for downloading a set of software items.

FIG. 6 illustrates an example method 600 for downloading a set of software items. Although execution of method 600 is described below with reference to the purchase order system 100 of FIG. 1 and the computer system 200 of FIG. 2, other suitable systems or devices for execution of method 600 can be possible. In particular examples, method 600 implements a portion of a software tool received and executed by the computer system 200 of FIG. 2, which may receive the software tool from the purchase order system 100 of FIG. 1. As illustrated in FIG. 2, portions of method 600 may be implemented in the form of executable instructions stored on a computer-readable medium or in the form of electronic circuitry.

In FIG. 6, method 600 begins at block 602, with the computer system 200 determining a hardware identifier associated with the computer system 200. As described herein, example hardware identifiers include, without limitation, a serial number, a model number, or some other identifier associated with the computer system 200, or a serial number, a model number, or some other identifier associated with a hardware component included by the computer system 200.

At block 604, the computer system 200 obtains purchase order data from the purchase order system 100 and obtains the purchase order data based on the hardware identifier determined at block 502. For instance, the computer system 200 may request the purchase order data from the purchase order system 100 and provide its hardware identifier as part of the request. As noted herein, the purchase order system 100 can utilize the provided the hardware identifier of the computer system 200 to locate and retrieve purchase order data associated with the computer system 200.

At block 606, the computer system 200 downloads a set of software items based on the purchase order data. As described herein, examples of software items can include, without limitation, software products or software configurations that can be installed on the computer system 200.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method, comprising:
receiving physical identifier data relating to a set of physical identifiers associated with a customer-ordered computer system;
generating, based on the physical identifier data, purchase order data associated with the customer-ordered computer system, wherein the purchase order data describes a set of software items to be installed on the customer-ordered computer system;
storing, on a datastore, the purchase order data in association with a hardware identifier associated with the customer-ordered computer system; and
sending a software tool to the customer-ordered computer system, wherein the software tool is to cause the customer-ordered computer system to:
obtain the purchase order data from the datastore based on the hardware identifier associated with the customer-ordered computer system, wherein the purchase order data is stored as a data file having a filename associated with the hardware identifier associated with the customer-ordered computer system; and obtain the set of software items based on the purchase order data file having the filename associated with the hardware identifier associated with the customer-ordered computer system.

2. The method of claim 1, wherein the software tool is configured to cause the customer-ordered computer system to automatically obtain the hardware identifier from the customer-ordered computer system.

3. The method of claim 1, wherein the software tool is configured to cause the customer-ordered computer system to determine, by the hardware identifier, whether the purchase order data exists on the datastore.

4. The method of claim 1, wherein the software tool is configured to cause the customer-ordered computer system to install the set of software items.

5. The method of claim 1, comprising generating the set of physical identifiers based on a customer order to assemble the customer-ordered computer system.

6. The method of claim 1, wherein the set of physical identifiers includes a radio-frequency identification (RFID).

7. The method of claim 1, wherein the physical identifier data is received from a radio-frequency identification (RFID) scanner.

8. The method of claim 1, wherein the set of physical identifiers includes a physical identifier associated with at least one software item in the set of software items to be installed on the customer-ordered computer system.

9. The method of claim 1, wherein the set of physical identifiers includes a physical identifier associated with a hardware component included by the customer-ordered computer system, and the set of software items includes a software configuration associated with the hardware component.

10. The method of claim 1, wherein the set of software items includes a software product to be installed on the customer-ordered computer system.

11. A system, comprising:
a hardware processor; and
a memory resource storing machine-readable instructions to cause the processor to:
read a set of physical identifiers affixed to a customer-ordered computer system;
generate, based on physical identifier data relating to the set of physical identifiers, purchase order data associated with the customer-ordered computer system, wherein the purchase order data describes a set of software items;
store the purchase order data with a hardware identifier on a datastore and associate the purchase order with the customer-ordered computer system; and
send a software tool to the customer-ordered computer system, wherein the software tool is configured to cause the customer-ordered computer system to:
obtain the purchase order data from the datastore based on a hardware identifier associated with the customer-ordered computer system, wherein the purchase order data is stored as a data file having a filename associated with the hardware identifier associated with the customer-ordered computer system; and
obtain the set of software items based on the purchase order data file having the filename associated with the hardware identifier associated with the customer-ordered computer system.

12. The system of claim 11, wherein the software tool is configured to cause the customer-ordered computer system to automatically determine the hardware identifier from the customer-ordered computer system.

13. The system of claim 11, wherein the software tool is configured to cause the customer-ordered computer system to determine, by the hardware identifier, whether the purchase order data exists on the datastore.

14. A computer system, comprising:
a processor; and
a memory including instructions being executable by the processor to:
determine a hardware identifier associated with the computer system;
obtain purchase order data from a datastore based on the hardware identifier, wherein the purchase order data is:
generated based on physical identifier data relating to a set of physical identifiers associated with the computer system; and
stored as a data file having a filename associated with the hardware identifier associated with the customer-ordered computer system; and
download a set of software items based on the purchase order data file having the filename associated with the hardware identifier associated with the customer-ordered computer system.

* * * * *

UNITED STATES PATENT AND TRADEMARK OFFICE
CERTIFICATE OF CORRECTION

PATENT NO. : 10,379,878 B2
APPLICATION NO. : 15/521997
DATED : August 13, 2019
INVENTOR(S) : Lawrence Williams

Page 1 of 1

It is certified that error appears in the above-identified patent and that said Letters Patent is hereby corrected as shown below:

In the Drawings

In sheet 6 of 6, FIG. 6, reference numeral 606, Line 2, delete "Oder" and insert -- Order --, therefor.

Signed and Sealed this
Twenty-sixth Day of November, 2019

Andrei Iancu
*Director of the United States Patent and Trademark Office*